United States Patent
Surampalli et al.

(10) Patent No.: US 11,308,073 B2
(45) Date of Patent: Apr. 19, 2022

(54) DATABASE NODE FUNCTIONAL TESTING

(71) Applicant: International Business Machines Corporation, Armonk, NY (US)

(72) Inventors: Murali Krishna Surampalli, Bangalore (IN); Anoop G. M. Ramachandra, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 16/058,148

(22) Filed: Aug. 8, 2018

(65) Prior Publication Data

US 2020/0050691 A1  Feb. 13, 2020

(51) Int. Cl.
  *G06F 16/23* (2019.01)
  *G06F 11/36* (2006.01)

(52) U.S. Cl.
  CPC ...... *G06F 16/2365* (2019.01); *G06F 11/3668* (2013.01); *G06F 16/2379* (2019.01)

(58) Field of Classification Search
  CPC ............. G06F 16/2365; G06F 16/2379; G06F 11/3668
  See application file for complete search history.

(56) References Cited

U.S. PATENT DOCUMENTS

| | | | |
|---|---|---|---|
| 7,124,302 B2 | 10/2006 | Ginter et al. | |
| 10,855,475 B1 * | 12/2020 | Leach | H04L 9/0637 |
| 10,872,381 B1 * | 12/2020 | Leise | G06F 16/90335 |
| 2008/0126869 A1 * | 5/2008 | Kraft | G06F 21/55 |
| | | | 714/37 |
| 2011/0173591 A1 * | 7/2011 | Prasad | G06F 8/30 |
| | | | 717/126 |
| 2015/0379510 A1 | 12/2015 | Smith | |
| 2017/0011460 A1 | 1/2017 | Molinari et al. | |
| 2017/0085545 A1 | 3/2017 | Lohe et al. | |
| 2017/0140408 A1 * | 5/2017 | Wuehler | G06Q 30/0207 |
| 2017/0155515 A1 * | 6/2017 | Androulaki | H04L 9/008 |
| 2017/0243193 A1 | 8/2017 | Manian et al. | |
| 2018/0248880 A1 * | 8/2018 | Sardesai | H04L 9/3239 |

(Continued)

FOREIGN PATENT DOCUMENTS

CN  105809062 A  7/2016

OTHER PUBLICATIONS

Anonymous, IPCOM000248083D, "System and Method for Software Asset Management Powered by Blockchain and Smart Contracts," ip.com, Oct. 24, 2016.

(Continued)

*Primary Examiner* — Jensen Hu

(57) ABSTRACT

An example operation may include one or more of receiving a database storage request at a decentralized database, executing an operation of the database storage request at a database node based on chaincode to generate a simulated result without committing the database storage request to the decentralized database, determining whether the chaincode of the database node is valid via a functional testing that is performed based on an output of the execution of the database storage request, and, in response to determining the chaincode is valid, endorsing the database storage request for storage at the decentralized database and transmitting the endorsement to one or more database nodes of the decentralized database.

18 Claims, 11 Drawing Sheets

(56) References Cited

U.S. PATENT DOCUMENTS

| | | | |
|---|---|---|---|
| 2018/0293366 A1* | 10/2018 | Subramaniyan | G06F 21/10 |
| 2018/0365686 A1* | 12/2018 | Kondo | H04L 63/123 |
| 2019/0303541 A1* | 10/2019 | Reddy | H04L 9/0643 |
| 2019/0347658 A1* | 11/2019 | Haimes | G06Q 40/02 |

OTHER PUBLICATIONS

Anonymous, IPCOM000250922D, "System and Method of secure and permissioned sharing of Cognitive Patterns in a Marketplace." ip.com, Sep. 14, 2017.

C. Clack, "Smart Contract Templates: foundations, design landscape and research directions." Aug. 4, 2016 (Revised Mar. 15, 2017). https://arxiv.org/abs/1608.00771. [Accessed Oct. 23, 2017].

D. Mamnani, "Testing of Smart Contracts in the Blockchain world—Capgemini Worldwide" Jan. 12, 2017. https://www.capgemini.eom/2017/01/testing-of-smart-contracts-in-the-blockchain-world/ [Accessed Dec. 14, 2017].

Hyperledger, "Hyperledger Fabric FAQs—hyperiedger-fabricdocs master documentation." https://hyperiedger-fabric.readthedocs.io/en/v1.0.0-beta/FAQ/architecture_FAQ.html [Accessed Dec. 14, 2017].

J. Stark "Making Sense of Blockchain Smart Contracts." https://www.coindesk.com/making-sense-smart-contracts/[Accessed Oct. 23, 2017].

L. Luu, "Making Smart Contracts Smarter" In Proceedings of the 2016 ACM SIGSAC Conference on Computer and Communications Security (CCS '16). ACM, New York, NY, USA, 254-269, 2016.

M. Staples, "Risks and Opportunities for Systems Using Blockchain and Smart Contracts," (May 2017) Data61 (CSIRO), Sydney, https://doi.org/10.4225/08/596e5ab7917bc.

P. Satyavolu, "Blockchain's Smart Contracts: Driving the Next Wave of Innovation Across Manufacturing Value Chains." Cognizant 20-20 Insights Whitepaper. Jun. 2016. https://www.cognizant.com/whitepapers/blockchains-smart-contracts-driving-the-next-wave-of-innovation-across-manufacturing-value-chains-codex2113.pdf.

Q. Dupont, "Ledgers and Law in the Blockchain." King's Review, Jun. 23, 2015. Preprint.http://kingsreview.co.uk/articles/ledgers-and-law-in-the-blockchain/http://kingsreview.co.uk/magazine/blog/2015/06/23/ledgers-and-law-in-the-blockchain.

S. Kirkman, "Using Smart Contracts and Blockchains to Support Consumer Trust Across Distributed Clouds." Int'l Conf. Grid, Cloud, & Cluster Computing (GCC'17) 2017, pp. 10-16.

S. Mery, "Make your blockchain smart contracts smarter with business rules." https://www.ibm.com/developerworks/library/mw-1708-mery-blockchain/1708-mery.html[AccessedDec. 14, 2017].

T. Dickerson, "Adding Concurrency to Smart Contracts." In Proceedings of the ACM Symposium on Principles of Distributed Computing (PODC '17). ACM, New York, NY, USA, 303-312, 2017.

* cited by examiner

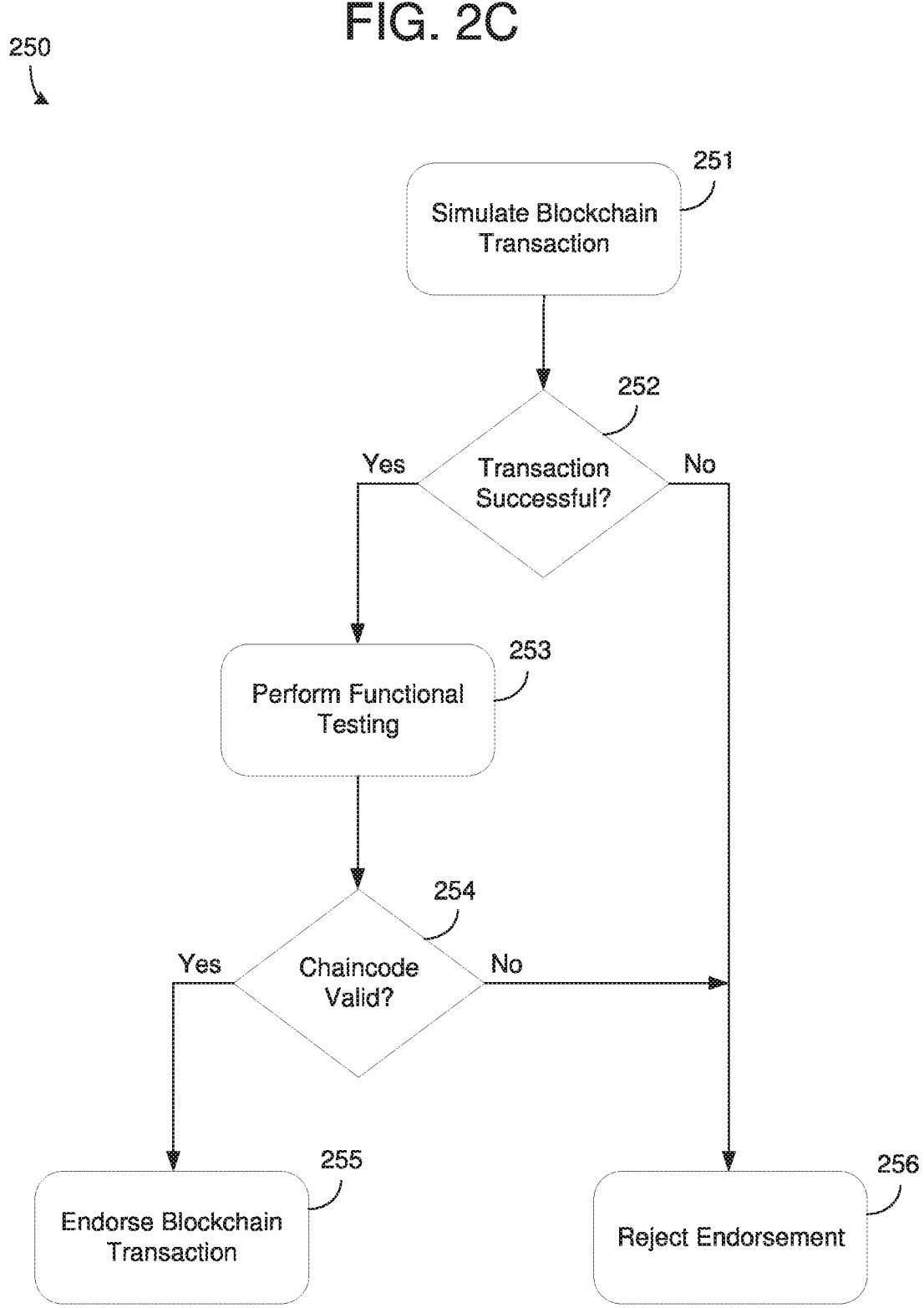

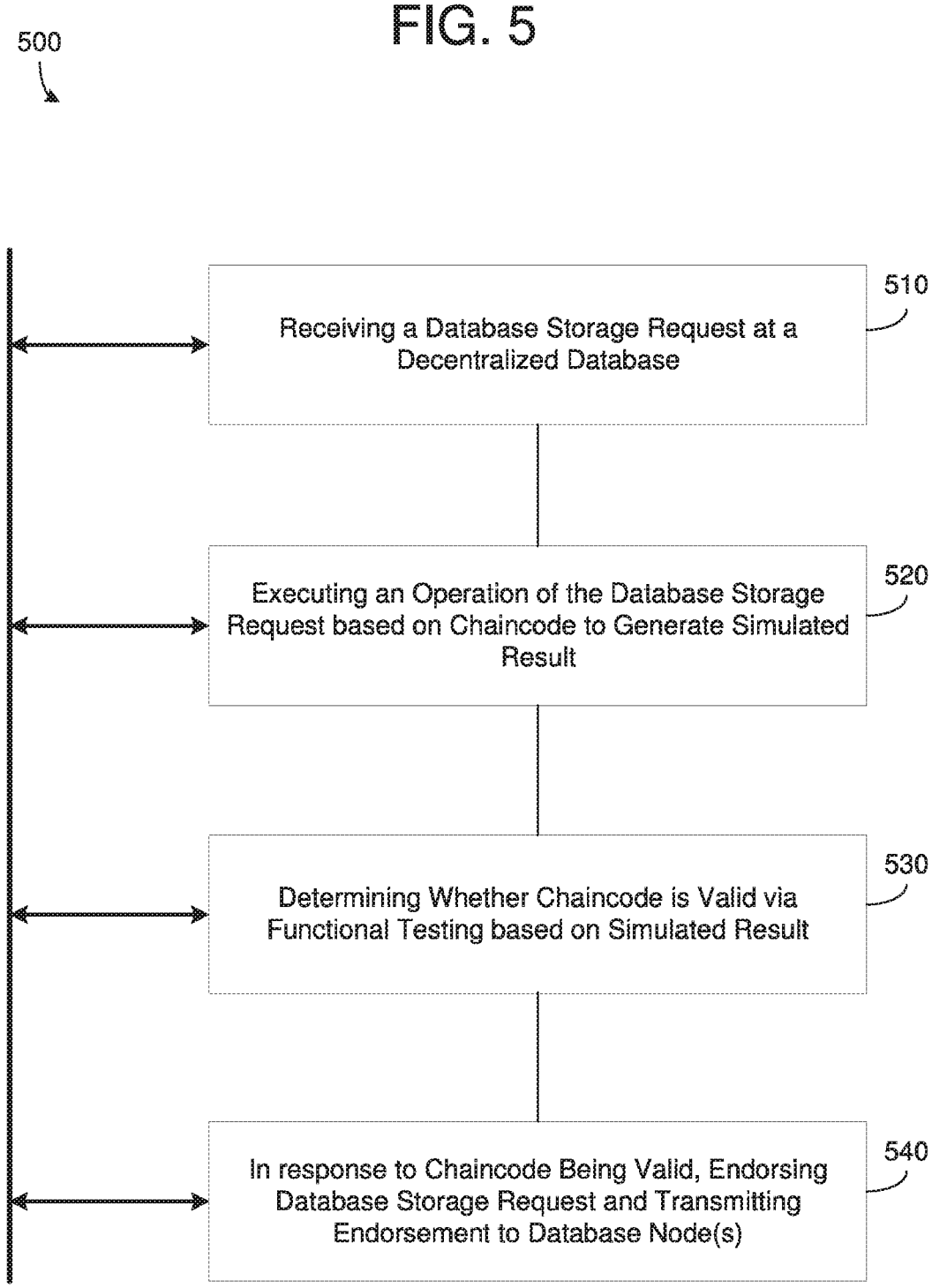

DATABASE NODE FUNCTIONAL TESTING

TECHNICAL FIELD

This application generally relates to a database storage system, and more particularly, to a decentralized database in which functional testing of chaincode software is performed by a storage node during an endorsement process.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. Because of its single location, a centralized database is easy to manage, maintain, and control, especially for purposes of security. Within a centralized database data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, centralized databases are highly dependent on network connectivity. As a result, the slower the Internet connection, the longer the amount of time needed for each database access. Another drawback is that bottlenecks when the centralized database experiences of high traffic due to the single location. Furthermore, a centralized database provides limited access to data because only one copy of the data is maintained by the database. As a result, multiple user stations cannot access the same piece of data at the same time without creating significant problems or risk overwriting stored data. Furthermore, because a central database system has minimal to no data redundancy, if a set of data is unexpectedly lost it is very difficult to retrieve it other than through manual operation from back-up disk storage.

A decentralized database provides a storage system capable of addressing the drawbacks of a centralized database. However, a decentralize database often includes multiple storage nodes corresponding to multiple entities. Conventionally, one entity must trust software that is uploaded and distributed to the storage nodes by another entity. In this case, if the software later turns out to be faulty, stored data must be undone to compensate for the faulty software program. This process can be difficult and inefficient. As such, what is needed is a new way for testing database software to overcome these limitations.

SUMMARY

One example embodiment may provide a method that includes one or more of receiving a database storage request at a decentralized database, executing an operation of the database storage request at a database node based on chaincode to generate a simulated result without committing the database storage request to the decentralized database, determining whether the chaincode of the database node is valid via a functional testing that is performed based on an output of the execution of the database storage request, and in response to determining the chaincode is valid, endorsing the database storage request for storage at the decentralized database and transmitting the endorsement to one or more database nodes of the decentralized database.

Another example embodiment may provide a system that includes one or more of a network interface configured to receive a database storage request at a database node of a decentralized database, and a processor configured to one or more of execute an operation of the database storage request at the database node based on chaincode to generate a simulated result without a storage of the database storage request at the decentralized database, determine whether the chaincode of the database node is valid via a functional test that is performed based on an output of the execution of the database storage request, and, in response to a determination that the chaincode is valid, endorse the database storage request for storage at the decentralized database and control the network interface to transmit the endorsement to one or more database nodes of the decentralized database.

A further example embodiment may provide a non-transitory computer readable medium comprising instructions, that when read by a processor, cause the processor to perform one or more of receiving a database storage request at a decentralized database, executing an operation of the database storage request at a database node based on chaincode to generate a simulated result without committing the database storage request to the decentralized database, determining whether the chaincode of the database node is valid via a functional testing that is performed based on an output of the execution of the database storage request, and in response to determining the chaincode is valid, endorsing the database storage request for storage at the decentralized database and transmitting the endorsement to one or more database nodes of the decentralized database.

BRIEF DESCRIPTION OF THE DRAWINGS

FIG. 2C is a diagram illustrating a peer node performing a functional testing of chaincode, according to example embodiments.

FIG. 5 is a diagram illustrating a method of endorsing a functionality of chaincode via a database node, according to example embodiments.

DETAILED DESCRIPTION

Figure 1:
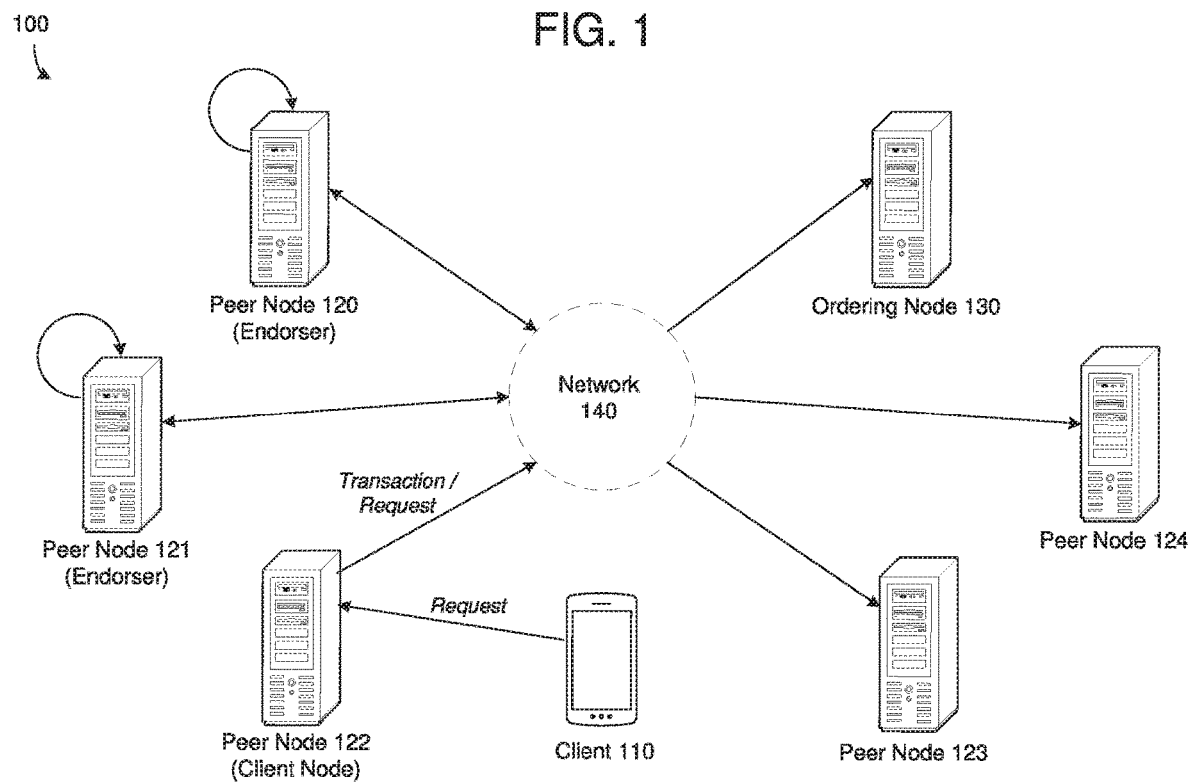
FIG. 1 is a diagram illustrating of a decentralized database network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide functional testing of chaincode (smart contract) during an endorsement process of a blockchain transaction.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts trans-action-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The instant application relates to a decentralized database (e.g., blockchain) in which a functional testing of chaincode is performed during an endorsement process. The functional testing ensures that the function of the chaincode is performing as agreed upon by different and untrusting members of the blockchain. Some of the benefits of such a system include a virtual legal framework that is built as a software component which verifies if a coded agreement between untrusting entities of a blockchain satisfies previously agreed upon terms and conditions discussed which may be agreed to off-chain. Another benefit is that the validation is developed by individual organizations (and integrated into a peer node controlled by the organizations) so that their interests are always validated and hence deemed protected.

Blockchain provides the notion of elimination of a trust based system through the building trust free systems. If looked at it deeply, however, the element of trust is still present in blockchain systems. However, the trust is now shifted from individuals and organizations to software applications developed on the Blockchain. In a business world, not all transactions are of binary kind especially when multi party agreements are made. In a real world situation these agreements are jointly documented, reviewed, and scrutinized by each of the organization's legal teams. With blockchain, when the legal contracts are codified (i.e., saved as a code), it is impossible for a legal team to verify what is saved in the contract. This puts the organizations in a position to trust and accept the software. However, because the software is provided by a third party or developed by a leading member of the consortium, the risk to the other peers (e.g. other organizations with other interests) is high. The example embodiments overcome this lack of trust by integrating a functional testing of chaincode of the blockchain which is used to execute the transactions at each endorsing peer. In addition to a traditional endorsement process (i.e., transaction successfully processed by authorized parties), the functional testing described herein validates whether the chaincode satisfies one or more predetermined business rules which may be previously agreed upon by the parties.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the functional testing of chaincode is implemented because of smart contracts, decentralization, and consensus which are inherent and unique properties of blockchain. In particular, because the legal contracts are implemented as a smart contracts, a counter force is integrated to verify and validate these smart contracts from business standpoint. Then, a consensus is formed by analyzing the outcome of functional validation phase of the smart contract.

The example embodiments are specific to blockchain. In other words, the example embodiments cannot be performed via a centralized database because in the centralized database one entity has control over software that is added and stored on the database. In contrast, blockchain is decentralized and does not have a central authority. Therefore, additional measures must be implemented to ensure trust and accountability through a decentralized endorsement and consensus process.

FIG. 1 illustrates a decentralized database network 100, according to example embodiments. In this example, the decentralized database network 100 is a blockchain. Referring to FIG. 1, the network 100 includes a plurality of peer nodes 120-124 and an ordering service (ordering node 130) which are connected to each other via a network 140. Here, the peer nodes 120-124 and the ordering service 130 are included within a decentralized database system such as a blockchain. Each of the peer nodes 120-124 and the ordering node 130 may be a server, a database, a CPU, or the like. The network 140 may be a private network, a public network, Internet, or the like.

Client 110 may store data, conduct business, and the like, and have the records of such data stored via a distributed ledger which is replicated across each of the peer nodes 120-124. In this example, when client 110 submits a transaction request to the blockchain network 110, the network 100 determines that the transaction request must be endorsed by peer nodes 120 and 121 from among peer nodes 120-124. Accordingly, peer nodes 120 and 121 may be referred to as endorsing nodes, in this example. In order to execute the transaction request submitted by the client 110, chaincode must be executed by each of the endorsing peer nodes 120 and 121 which simulates the transaction without committing the transaction.

Each of the peer nodes 120-124 need to update the ledger, so all peers do a validation step. However, not every peer node needs to execute the chaincode (smart contract) associated with the transaction. Accordingly, the network 100 may use endorsement policies to define which peers need to execute which transactions. This means that a given chaincode (smart contract) can be kept private from peers that aren't part of the endorsement policy. During the endorsement process, endorsing peers 120 and 121 may perform a first validation to determine whether the transaction was able to execute successfully. Here, each endorsing peer 120 and 121 may receive a bundle of information from the client 110 that is used to trigger a specific chaincode on each of the endorsing peer nodes 120 and 121. If the peer nodes successfully executes the chaincode on the transaction, a transaction is yielded for the distributed ledger. This is the first phase of the endorsement process. This endorsement process is traditionally signed by the endorsing peer as long as the transaction successfully executes (i.e., without any consideration for what happens to the underlying data involved in the transaction).

According to various embodiments, in addition to the traditional endorsement process, the endorsing peer nodes 120 and 121 may also perform a functional testing on the chaincode stored at each of the peer nodes 120 and 121. The functional testing may be executed based on an output of the simulation of the transaction. The functional testing may determine whether the chaincode has performed the appropriate business function it is intended to perform. The endorsing nodes 120 and 121 may use test data to determine if one or more business rules of the chaincode are satisfied. For example, if a lender is required to absorb a 10% loss on a defaulted loan, the functional testing may use test data to determine whether such 10% loss is actually absorbed as a result of processing the chaincode. As another example, if a transaction is related to food safety, the functional testing can determine if authenticity tests performed by the chaincode are the tests previously agreed upon and no additional tests were added or tests were removed, etc.

Traditional endorsement testing is generic to all endorsing nodes. In other words, whether the transaction is successful is determined in the same manner by each endorsing peer node 120 and 121. However, the functional testing (also referred to as functional unit test) is not generic to all endorsing peers 120 and 121, etc. Instead, the functional unit test cases can be written, deployed and run by each endorsing peer 120 and 121 independently. Furthermore, the functional unit test cases are not run by any central authority. Rather, the functional unit test cases, which are specific to peer nodes, may be run on a peer node and validate for a peer node if the outcome of the chaincode is expected as per actual contract the peer has entered into.

When both endorsing peers 120 and 121 endorse the transaction and the chaincode that is used to simulate the transaction, the endorsement can be transmitted back to the client 110 for transmission to the ordering node 130. When the ordering node 130 receives the endorsed transaction, the ordering node 130 can package the transaction into a block with other transactions and submit the block for storage by each of the peer nodes 120-124. Accordingly, the endorsed transaction can be stored within a data block of a blockchain which is replicated across the plurality of peer nodes 120-124.

Figure 2A:
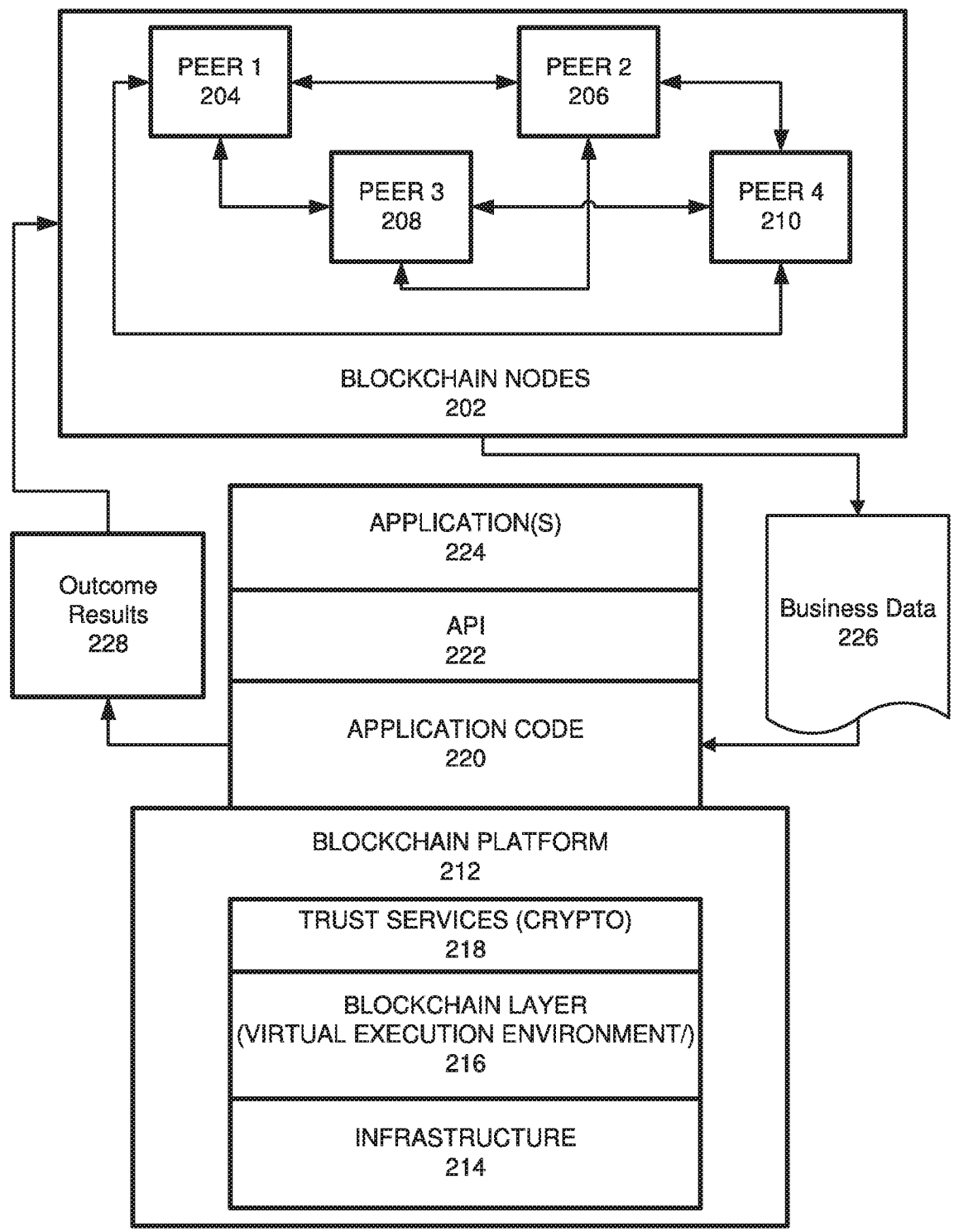
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract (chaincode) with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, business information 226 may be processed by one or more processing entities (e.g., virtual machines) included in the blockchain layer 216. The output 228 may include a result of processing the business data by the smart contract/chaincode. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
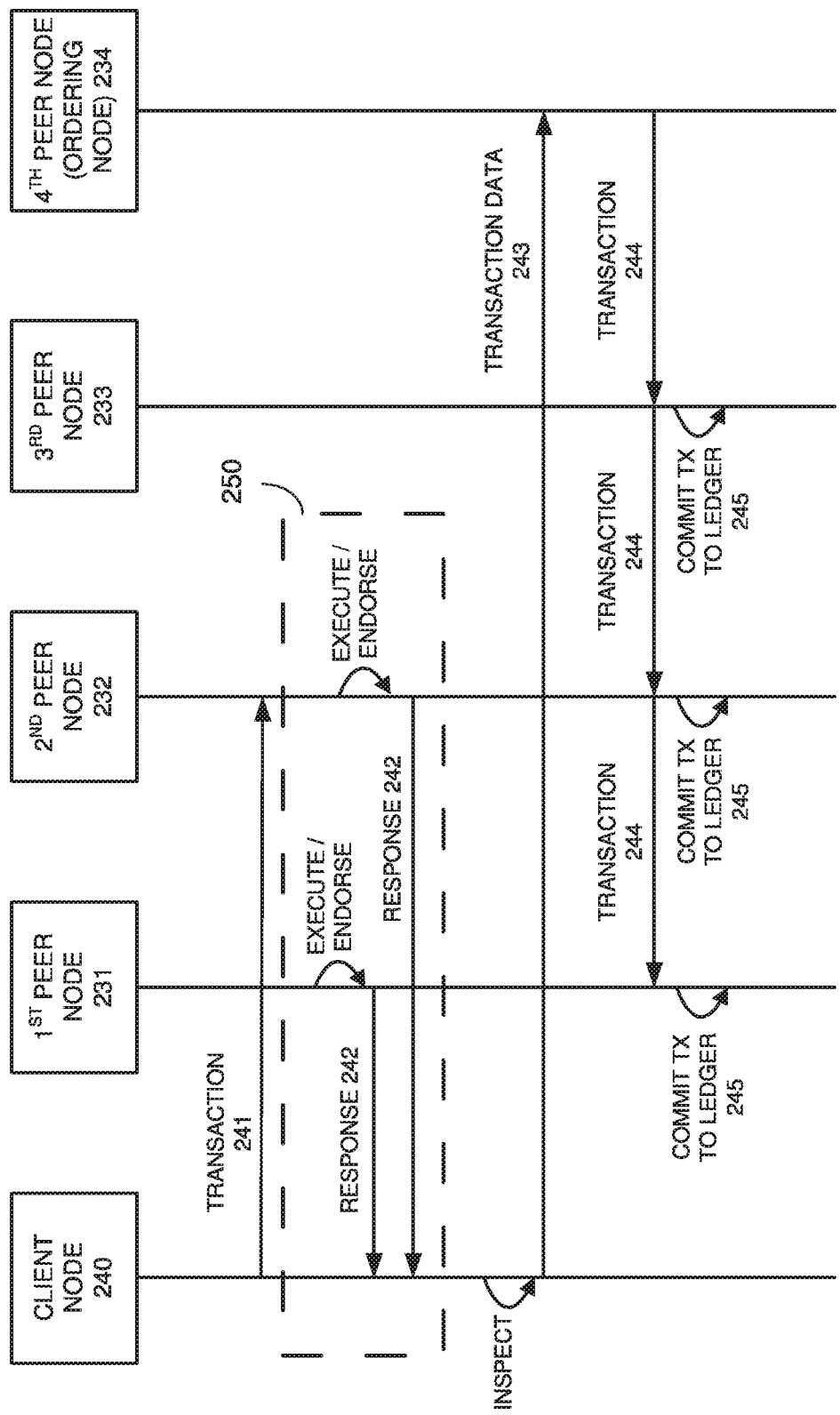
FIG. 2B is a diagram illustrating a peer node blockchain configuration, according to example embodiments.

FIG. 2B illustrates an example of a transactional flow 230 between nodes of the blockchain in accordance with an example embodiment. Referring to FIG. 2B, the transaction flow 230 may include a transaction proposal 241 sent by an application client node 240 endorsing peer nodes 231 and 232. The endorsing peers 231 and 232 may verify the client signature and execute a chaincode function to initiate the transaction. The output may include the chaincode results, a set of key/value versions that were read in the chaincode (read set), and the set of keys/values that were written in chaincode (write set). In addition to validating the transaction, the endorsing peers 231 and 232 may independently and distinctly validate the chaincode which is used to simulate the transaction. Here, each endorsing peer 231 and 232 may include its own functional test case which can be used to determine whether the chaincode is performing the requirements previously agreed upon. When both the transaction is successful and the chaincode is validated, the endorsing peers 231 and 232 submit an endorsement response 242 with a signature. If, however, one or more of the endorsing peers 231 and/or 232 does not successfully simulate the transaction or verify that the chaincode is functioning as intended, the endorsing peer nodes 231 and/or 232 may reject the endorsement.

The proposal response 242 is sent back to the client 240 along with an endorsement signature, if approved. The client 240 assembles the endorsements into a transaction payload 243 and broadcasts it to an ordering service node 234. The ordering service node 234 then delivers ordered transactions as blocks to all peers 231-233 on a common channel. Before committal to the blockchain, each peer 231-233 may validate the transaction. For example, the peers may check the endorsement policy to ensure that the correct allotment of the specified peers have signed the results and authenticated the signatures against the transaction payload 243.

Referring again to FIG. 2B, the client node 240 initiates the transaction 241 by constructing and sending a request to the peer node 231, which is an endorser. The client 240 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer nodes 231 and 232 may verify (a) that the transaction proposal is well formed, (b) the transaction has not been submitted already in the past (replay-attack protection), (c) the signature is valid, and (d) that the submitter (client 240, in the example) is properly authorized to perform the proposed operation on that channel. In addition, each of the endorsing peer nodes 231 and 232 further validates chaincode being used to simulate the transaction. The endorsing peer nodes 231 and 232 may take the transaction proposal inputs as arguments to the invoked chaincode function. The chaincode is then executed against a current state database to produce transaction results including a response value, read set, and write set. However, no updates are made to the ledger at this point. In 242, the set of values, along with the endorsing peer node's signature is passed back as a proposal response 242 to the SDK of the client 240 which parses the payload for the application to consume.

In response, the application of the client 240 inspects/verifies the endorsing peers signatures and compares the proposal responses to determine if the proposal response is the same. If the chaincode only queried the ledger, the application would inspect the query response and would typically not submit the transaction to the ordering node service 234. If the client application intends to submit the transaction to the ordering node service 234 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 243 the client 240 assembles endorsements into a transaction and broadcasts the transaction proposal and response within a transaction message to the ordering node 234. The transaction may contain the read/write sets, the endorsing peers signatures and a channel ID. The ordering node 234 does not need to inspect the entire content of a transaction in order to perform its operation, instead the ordering node 234 may simply receive transactions from all channels in the network, order them chronologically by channel, and create blocks of transactions per channel.

The blocks of the transaction are delivered from the ordering node 234 to all peer nodes 231-233 on the channel. The transactions 244 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 245 each peer node 231-233 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

FIG. 2C illustrates a process 250 of a peer node performing a functional testing of chaincode, according to example embodiments. The process may correspond to dashed portion 250 shown in FIG. 2B. The process 250 may be triggered by a client application submitting a transaction proposal which triggers chaincode. Here, the same chain code will be running in multiple peers who have conflicting business interest. Based on the endorsement policy the endorsing peers execute the transaction as a simulation, in 251, without updating the ledger itself. In traditional blockchain processing, if the transaction is successfully simulated (i.e., no errors during the execution) the transaction was automatically endorsed and sent to an ordering service which then generated a block and transmitted the block to all committing peers. However, traditional endorsement did not verify any business related information with respect to the chaincode.

According to various embodiments, when the transaction is determined to be successfully simulated in 252, the endorsing node may perform an additional functional testing in 253. The functional testing can be written independently for each endorsing peer node and can be performed to ensure that the endorsing peer node's business interests are protected. Here, the endorsing peer node may determine whether the business rules agreed upon by different parties in the blockchain are being met by the chaincode. Different types of business rules may be validated in 253. For example, whether a specific business rule is being used, whether an interest rate is being correctly used, whether a correct penalty is being implemented when a contract is broken, etc. In 254, the endorsing peer node determines whether the chaincode is valid. When both the transaction is successful in 252 and the chaincode is valid in 254, the endorsing peer node endorses the transaction in 255. However, if either the transaction is not successful or the chaincode is invalid, the endorsing peer node rejects the endorsement in 256 and notifies the client.

Figure 3:
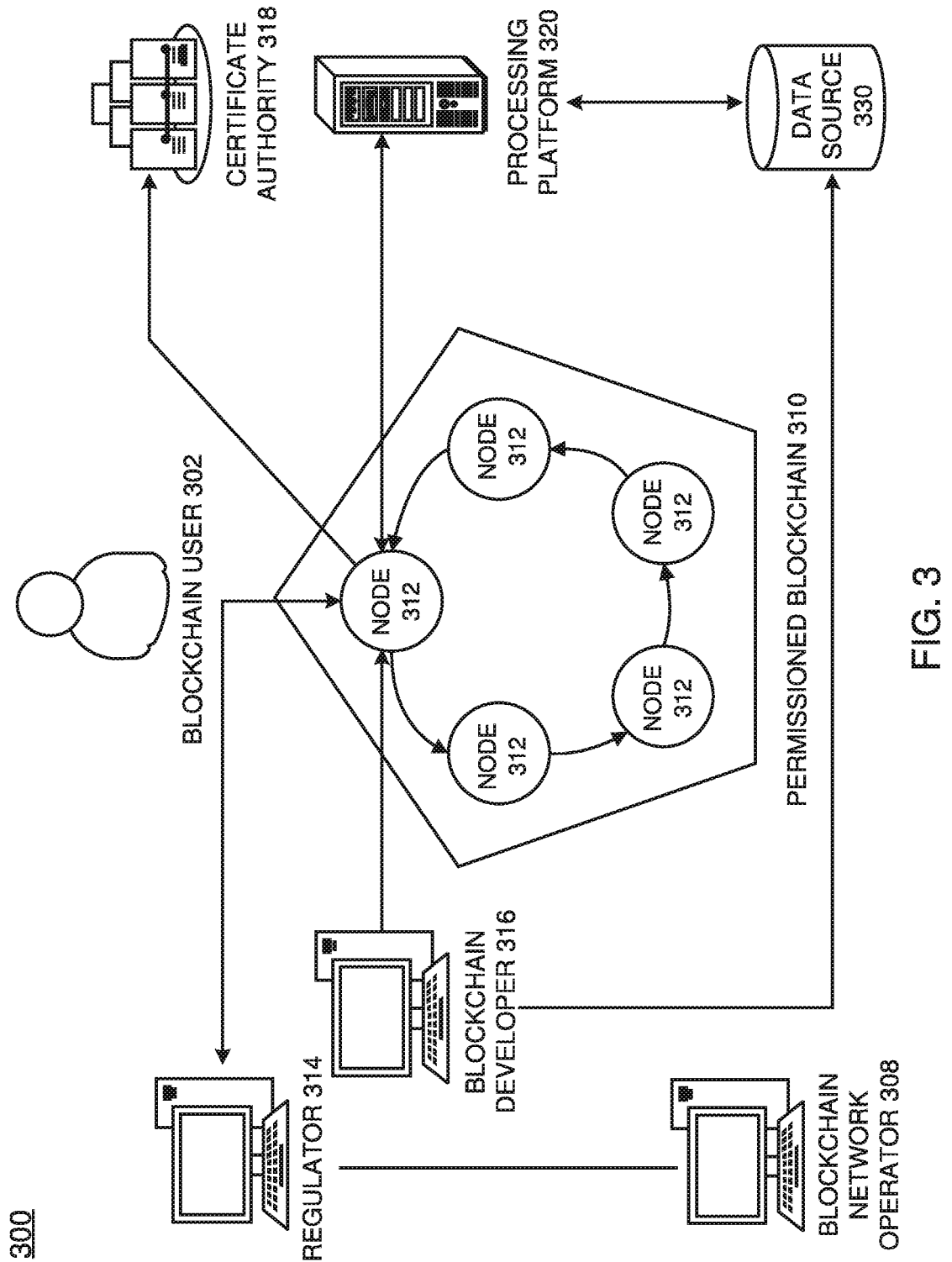
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. Here, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
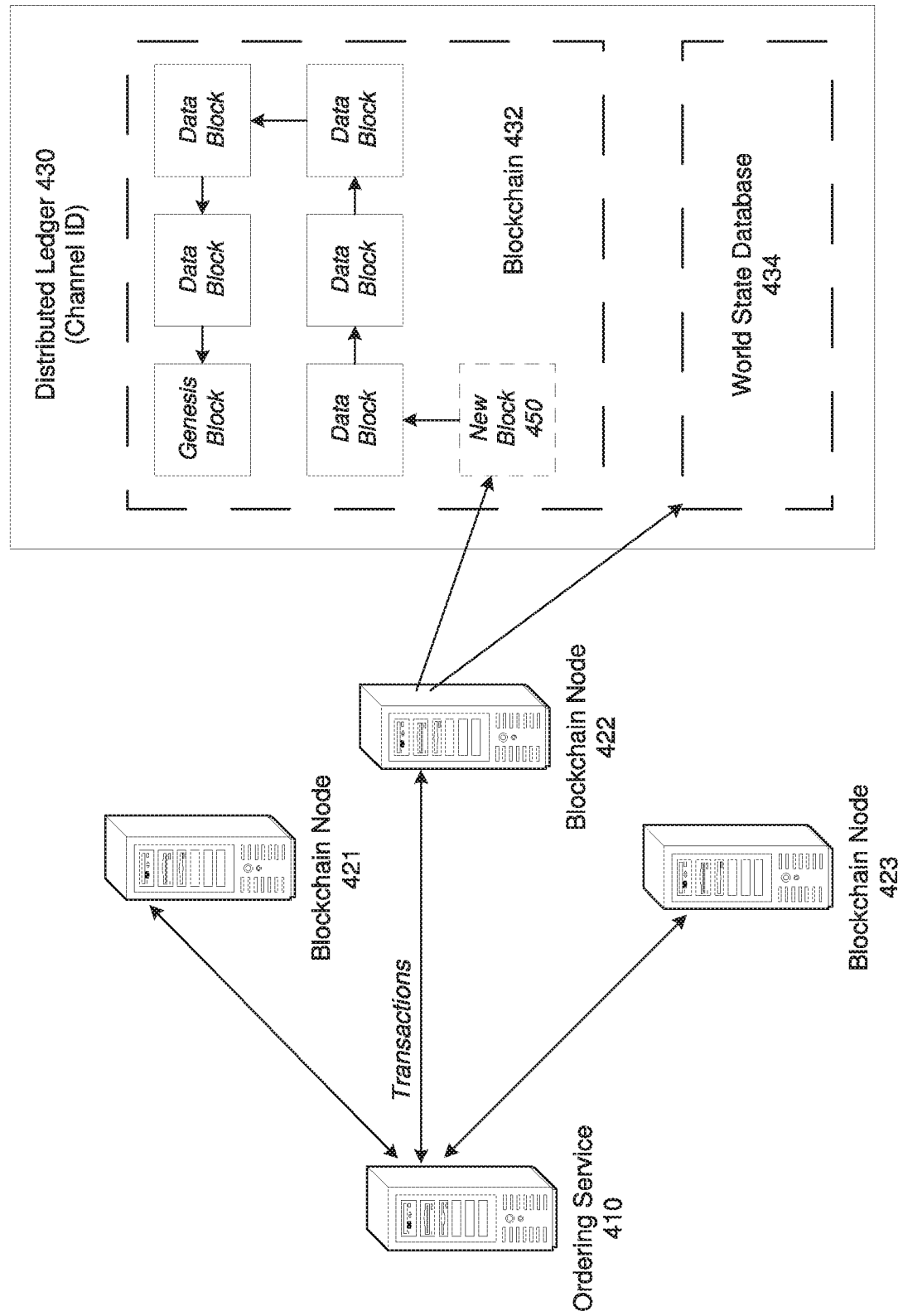
FIG. 4A is a diagram illustrating a process of a new block being added to a blockchain ledger, according to example embodiments.
Figure 4B:
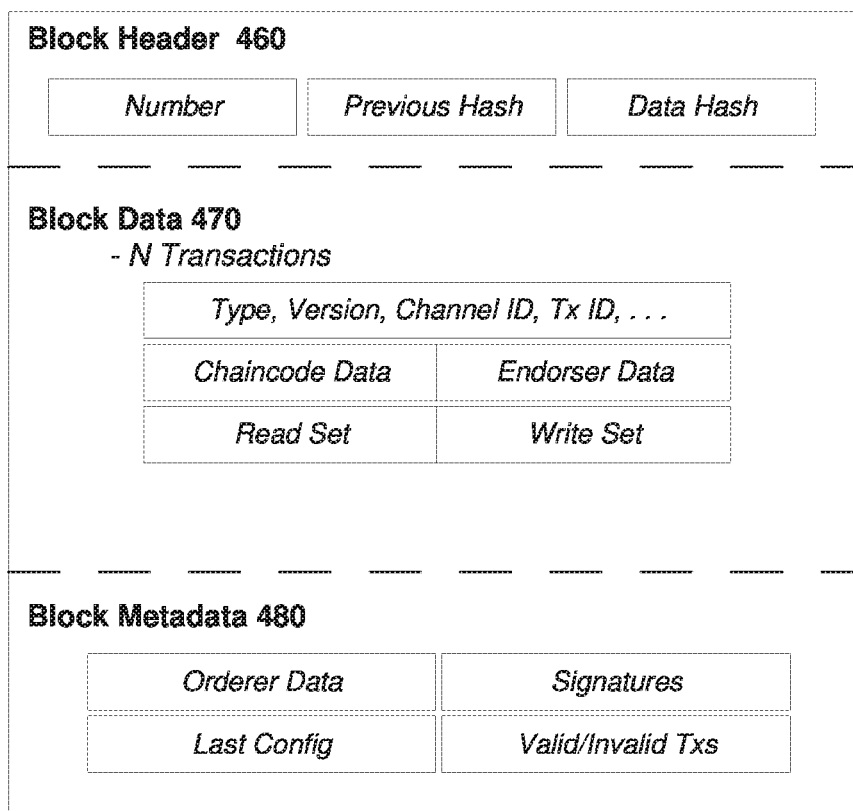
FIG. 4B is a diagram illustrating contents of a data block structure for blockchain, according to example embodiments.

FIG. 4A illustrates a process 400 of a new block being added to a distributed ledger 430, according to example embodiments, and FIG. 4B illustrates contents of a block structure 450 for blockchain, according to example embodiments. Referring to FIG. 4A, clients (not shown) may submit transactions to blockchain nodes 421, 422, and/or 423. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 421, 422, and 423) may maintain a state of the blockchain network and a copy of the distributed ledger 430.

Different types of blockchain nodes/peers may be present in the blockchain network including endorsing peers which simulate and endorse transactions proposed by clients and committing peers which verify endorsements, validate transactions, and commit transactions to the distributed ledger 430. In this example, the blockchain nodes 421, 422, and 423 may perform the role of endorser node, committer node, or both. According to various embodiments, the endorsing nodes described herein may also endorse chaincode executed by the endorsing peer to ensure that the chaincode satisfies one or more business rules agreed upon by untrusting members of the blockchain.

The distributed ledger 430 includes a blockchain 432 which stores immutable, sequenced records in blocks, and a state database 434 (current world state) maintaining a current state of the blockchain 432. One distributed ledger 430 may exist per channel and each peer maintains its own copy of the distributed ledger 430 for each channel of which they are a member. The blockchain 432 is a transaction log, structured as hash-linked blocks where each block contains a sequence of N transactions. Blocks may include various components such as shown in FIG. 4B. The linking of the blocks (shown by arrows in FIG. 4A) may be generated by adding a hash of a prior block's header within a block header of a current block. In this way, all transactions on the blockchain 432 are sequenced and cryptographically linked together preventing tampering with blockchain data without breaking the hash links. Furthermore, because of the links, the latest block in the blockchain 432 represents every transaction that has come before it. The blockchain 432 may be stored on a peer file system (local or attached storage), which supports an append-only blockchain workload.

The current state of the blockchain 432 and the distributed ledger 432 may be stored in the state database 434. Here, the current state data represents the latest values for all keys ever included in the chain transaction log of the blockchain 432. Chaincode invocations execute transactions against the current state in the state database 434. To make these chaincode interactions extremely efficient, the latest values of all keys are stored in the state database 434. The state database 434 may include an indexed view into the transaction log of the blockchain 432, it can therefore be regenerated from the chain at any time. The state database 434 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. According to various embodiments, the endorsement may include two stages including the endorsement of a transaction and endorsement of chaincode being used to execute/simulate the transaction. When an endorsing node is able to successfully simulate a transaction ($1^{st}$ check) and successfully verify that the chaincode satisfies one or more predefined business rules ($2^{nd}$ check), the endorsing node creates a transaction endorsement which is a signed response from the endorsing node to the client application indicating the endorsement of the simulated transaction. The second check is integrated with and provides an extension to a traditional endorsement process by enabling endorsing peer nodes to ensure that their interests are being satisfied by testing the performance of the function of chaincode (which can be provided from another untrusting entity). The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 410.

The ordering service 410 accepts endorsed transactions, orders them into a block, and delivers the blocks to the committing peers. For example, the ordering service 410 may initiate a new block when a threshold of transactions has been reached, a timer times out, or another condition. In the example of FIG. 4A, blockchain node 422 is a committing peer that has received a new data block 450 for storage on blockchain 430.

The ordering service 410 may be made up of a cluster of orderers. The ordering service 410 does not process transactions, smart contracts, or maintain the shared ledger. Rather, the ordering service 410 may accept the endorsed transactions and specifies the order in which those transactions are committed to the distributed ledger 430. The architecture of the blockchain network may be designed such that the specific implementation of 'ordering' (e.g., Solo, Kafka, BFT, etc.) becomes a pluggable component.

Transactions are written to the distributed ledger 430 in a consistent order. The order of transactions is established to ensure that the updates to the state database 434 are valid when they are committed to the network. Unlike a cryptocurrency blockchain system (e.g., Bitcoin, etc.) where ordering occurs through the solving of a cryptographic puzzle, or mining, in this example the parties of the distributed ledger 430 may choose the ordering mechanism that best suits that network.

When the ordering service 410 initializes a new block 450, the new block 450 may be broadcast to committing peers (e.g., blockchain nodes 421, 422, and 423). In response, each committing peer validates the transaction within the new block 450 by checking to make sure that the read set and the write set still match the current world state in the state database 434. Specifically, the committing peer can determine whether the read data that existed when the endorsers simulated the transaction is identical to the current world state in the state database 434. When the committing peer validates the transaction, the transaction is written to the blockchain 432 on the distributed ledger 430, and the state database 434 is updated with the write data from the read-write set. If a transaction fails, that is, if the committing peer finds that the read-write set does not match the current world state in the state database 434, the transaction ordered into a block will still be included in that block, but it will be marked as invalid, and the state database 434 will not be updated.

Referring to FIG. 4B, a block 450 (also referred to as a data block) that is stored on the blockchain 432 of the distributed ledger 430 may include multiple data segments such as a block header 460, block data 470, and block metadata 480. It should be appreciated that the various depicted blocks and their contents, such as block 450 and its contents. shown in FIG. 4B are merely for purposes of example and are not meant to limit the scope of the example embodiments. In some cases, both the block header 460 and the block metadata 480 may be smaller than the block data 470 which stores transaction data, however this is not a requirement. The block 450 may store transactional information of N transactions (e.g., 100, 500, 1000, 2000, 3000, etc.) within the block data 470. The block 450 may also include a link to a previous block (e.g., on the blockchain 432 in FIG. 4A) within the block header 460. In particular, the block header 460 may include a hash of a previous block's header. The block header 460 may also include a unique block number, a hash of the block data 470 of the current block 450, and the like. The block number of the block 450 may be unique and assigned in an incremental/sequential order starting from zero. The first block in the blockchain may be referred to as a genesis block which includes information about the blockchain, its members, the data stored therein, etc.

The block data 470 may store transactional information of each transaction that is recorded within the block 450. For example, the transaction data stored within block data 470 may include one or more of a type of the transaction, a version, a timestamp, a channel ID of the distributed ledger 430, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The block metadata 480 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 410. Meanwhile, a committing node of the block (such as blockchain node 422) may add validity/invalidity information based on an endorsement policy, verification of read/write sets, and the like. The transaction filter may include a byte array of a size equal to the number of transactions in the block data 470 and a validation code identifying whether a transaction was valid/invalid.

FIG. 5 illustrates a method 500 of endorsing a functionality of chaincode via a database node, according to example embodiments. For example, the method 500 may be performed by a blockchain peer node that is independent from other peer nodes that are members of a common blockchain. Referring to FIG. 5, in 510, the method may include receiving a database storage request at a decentralized database. For example, the database storage request may include a transaction that is to be stored on the blockchain. The transaction may include an exchange of assets, a purchase, a record, or the like.

In 520, the method may include executing an operation of the database storage request at a database node based on chaincode to generate a simulated result without committing the database storage request to the decentralized database. For example, the method may include simulating the blockchain transaction to determine a read set and a write set of the blockchain with respect to key values stored on the blockchain. For example, the read set may include a list of keys that the operation reads during the executing and the write set that includes a list of keys that the operations writes during the executing. The chaincode may be provided by an untrusting entity with respect to the node where the chaincode is stored. In other words, the chaincode may be provided by a different member of the blockchain that cannot be verified independently beforehand.

In 530, the method may include determining whether the chaincode of the database node is valid via a functional testing that is performed based on the execution of the database storage request. For example, the functional testing may determine whether the chaincode satisfies one or more predefined business rules which untrusting parties agreed upon. The chaincode may be executed by a peer node storing the chaincode. Also, the functional testing may be performed by the peer node storing the chaincode. In this way, the peer node can validate the chaincode stored therein. Such a testing allows a peer node to be sure that the chaincode works the way it is supposed to and protects interests of the organization associated with the peer node. The functional testing may be different and independent at each peer node. In some embodiments, the determining may include performing the functional testing on one or more of read set and the write set to determine whether the chaincode is valid. The functional testing may identify whether the chaincode output satisfies one or more business constraints indicated by a developer of the chaincode.

In response to determining the chaincode is valid, in 540 the method may include endorsing the database storage request for storage at the decentralized database and transmitting the endorsement to one or more database nodes of the decentralized database. The endorsement may include a signature of the peer node being added to the transaction and being sent back to the client node that submitted the storage request. In some embodiments, the method may further include receiving a data block including the endorsed database storage request, and storing the received data block within a hash-linked chain of data blocks at the decentralized database. Here, the hash-linked chain of blocks may include the blockchain. In some embodiments, the determining may further include determining whether to endorse the database storage request based on whether the simulation of the operation of the database storage request is successful. In this example, the endorsing of the database storage request for storage at the decentralized database may be performed in response to determining that the operation of the database storage request is successful and determining that the chaincode is valid.

Figure 6A:
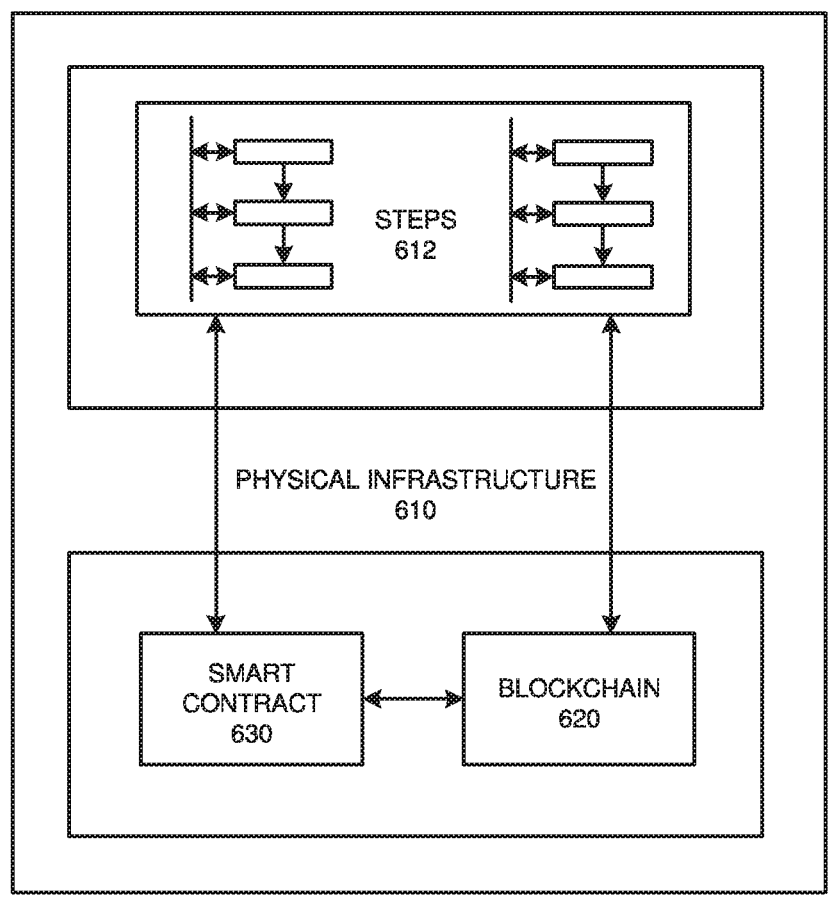
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
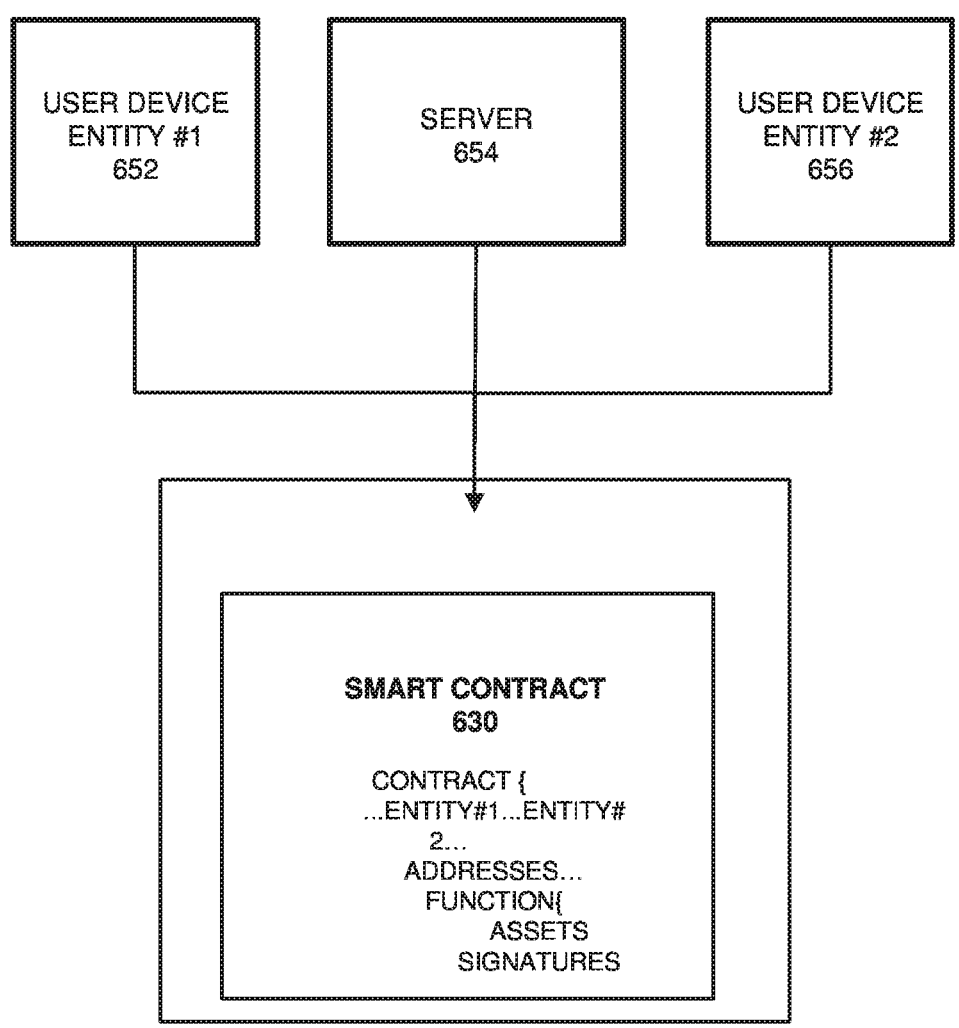
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction. According to various embodiments, the extension of the endorsement process described herein may verify that one or more functions (business rules) of the smart contract 640 are satisfied during a validation check by a blockchain peer.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
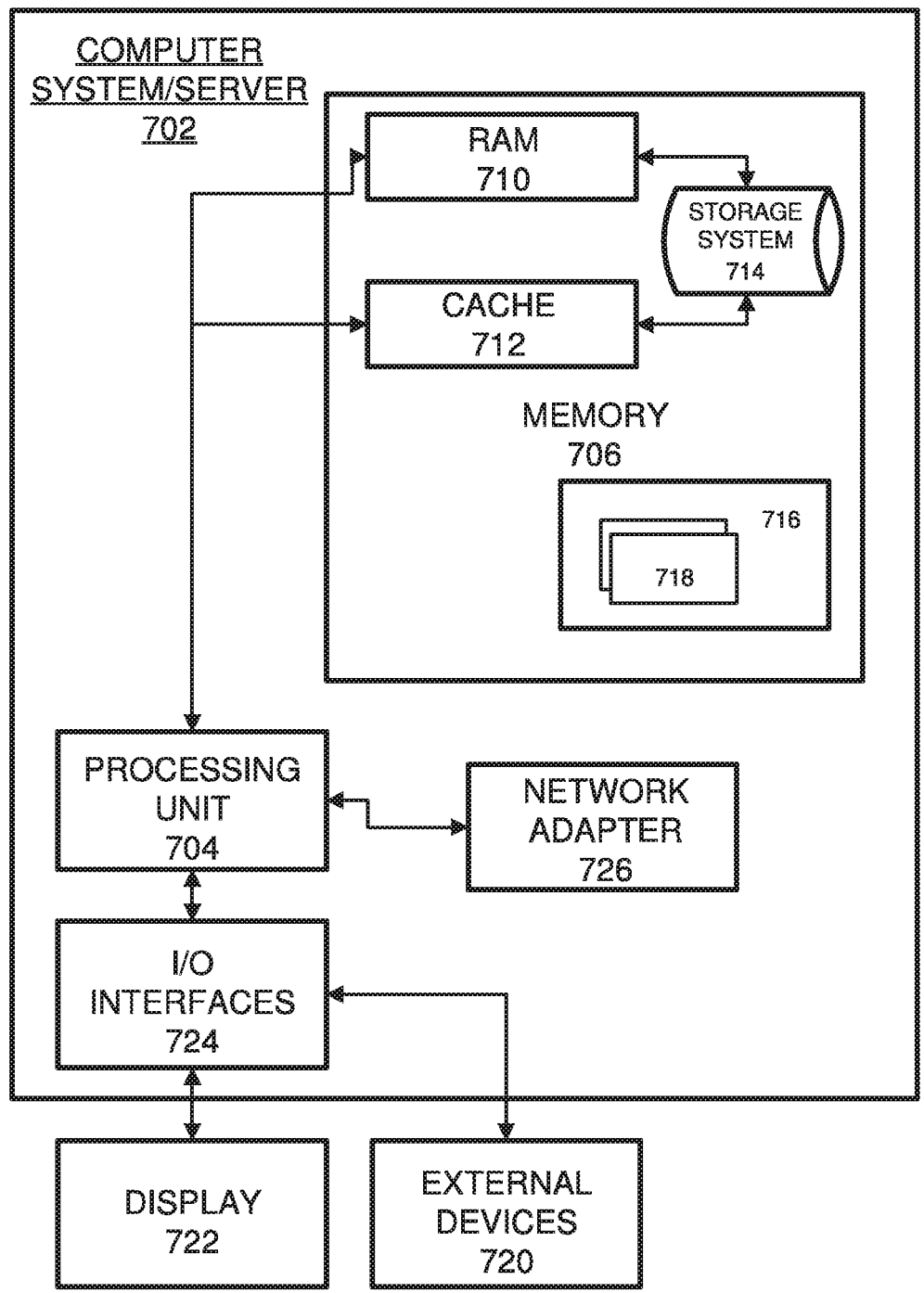
FIG. 7 is a diagram illustrating an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the network interface 726 may receive a database storage request at a database node of a decentralized database. In this example, the database storage request may be one or more blockchain transactions. The processor 704 may execute an operation of the database storage request at the database node based on chaincode to generate a simulated result without a storage of the database storage request at the decentralized database, and determine whether the chaincode of the database node is valid via a functional test that is performed based on the execution of the database storage request. Here, in response to a determination that the chaincode is valid, the processor 704 may endorse the database storage request for storage at the decentralized database and control the network interface 726 to transmit the endorsement to one or more database nodes of the decentralized database.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, offthe-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
a network interface configured to receive a database storage request at a database node of a decentralized database; and
a processor configured to execute an operation of the database storage request at the database node based on chaincode to generate a simulated result including a read set and a write set, and determine whether the chaincode of the database node is valid via a functional test that is performed during an endorsement phase based on one or more of the read set and the write set included in the generated simulated result of the database storage request,
wherein, in response to a determination that the operation executed successfully but the chaincode is invalid, the processor is further configured to reject to endorse the database storage request for storage at the decentralized database and control the network interface to transmit notice of the rejection to one or more other database nodes of the decentralized database.

2. The computing system of claim 1, wherein the read set comprises a list of keys that the operation reads during simulation and the write set comprises a list of keys that the operation writes during the simulation.

3. The computing system of claim 2, wherein the processor is configured to perform the functional test on both of the read set and the write set to determine whether the chaincode is valid.

4. The computing system of claim 1, wherein the functional test identifies whether the chaincode output satisfies one or more business constraints indicated by a developer of the chaincode.

5. The computing system of claim 1, wherein the chaincode is provided from an untrusted entity with respect to the database storage node.

6. The computing system of claim 1, wherein the processor is further configured to determine whether to endorse the database storage request based on whether the simulation of the operation of the database storage request is successful.

7. The computing system of claim 6, wherein, in response to a determination that the operation of the database storage request is successful and a determination that the chaincode is valid, the processor is further configured to endorse the storage request for storage at the decentralized database.

8. A method comprising:
receiving a database storage request at a decentralized database;
executing an operation of the database storage request at a database node based on chaincode to generate a simulated result including a read set and a write set;
determining whether the chaincode of the database node is valid via a functional testing that is performed during an endorsement phase based on one or more of the read set and the write set included in the generated simulated result of the database storage request; and
in response to determining the operation executed successfully but the chaincode is invalid, reject endorsing the database storage request for storage at the decentralized database and transmitting a notice of the rejection to one or more other database nodes of the decentralized database.

9. The method of claim 8, wherein the read set comprises a list of keys that the operation reads during the executing and the write set comprises a list of keys that the operations writes during the executing.

10. The method of claim 9, wherein the determining comprises performing the functional testing on both of the read set and the write set to determine whether the chaincode is valid.

11. The method of claim 8, wherein the functional testing identifies whether the chaincode output satisfies one or more business constraints indicated by a developer of the chaincode.

12. The method of claim 8, wherein the chaincode is provided from an untrusted entity with respect to the database storage node.

13. The method of claim 8, wherein the determining further comprises determining whether to endorse the database storage request based on whether the simulation of the operation of the database storage request is successful.

14. The method of claim 13, wherein the method further comprises endorsing a second database storage request for storage at the decentralized database in response to determining that an operation of the second database storage request is successful and determining that chaincode of the second database storage request is valid.

15. A non-transitory computer readable medium comprising instructions, that when read by a processor, cause the processor to perform:
   receiving a database storage request at a decentralized database;
   executing an operation of the database storage request at a database node based on chaincode to generate a simulated result including a read set and a write set;
   determining whether the chaincode of the database node is valid via a functional testing that is performed during an endorsement phase based on one or more of the read set and the write set included in the generated simulated result of the database storage request; and
   in response to determining the operation executed successfully but the chaincode is invalid, reject endorsing the database storage request for storage at the decentralized database and transmitting a notice of the rejection to one or more other database nodes of the decentralized database.

16. The non-transitory computer readable medium of claim 15, wherein the read set comprises a list of keys that the operation reads during the executing and the write set comprises a list of keys that the operations writes during the executing.

17. The non-transitory computer readable medium of claim 16, wherein the determining comprises performing the functional testing on both of the read set and the write set to determine whether the chaincode is valid.

18. The non-transitory computer readable medium of claim 15, wherein the functional testing identifies whether the chaincode output satisfies one or more business constraints indicated by a developer of the chaincode.

* * * * *